(12) United States Patent
Gopathy et al.

(10) Patent No.: US 12,506,778 B2
(45) Date of Patent: Dec. 23, 2025

(54) TECHNIQUES FOR DETECTING AND MITIGATING SPOOFED EMAIL COMMUNICATIONS

(71) Applicant: Cisco Technology, Inc., San Jose, CA (US)

(72) Inventors: Suresh Gopathy, Alpharetta, GA (US); Gajendar Pandey, Delhi (IN)

(73) Assignee: Cisco Technology, Inc., San Jose, CA (US)

( * ) Notice: Subject to any disclaimer, the term of this patent is extended or adjusted under 35 U.S.C. 154(b) by 214 days.

(21) Appl. No.: 18/185,221

(22) Filed: Mar. 16, 2023

(65) Prior Publication Data

US 2024/0314163 A1    Sep. 19, 2024

(51) Int. Cl.
| | | |
|---|---|---|
| *H04L 9/40* | (2022.01) | |
| *G06V 10/74* | (2022.01) | |
| *G06V 30/19* | (2022.01) | |
| *H04L 51/21* | (2022.01) | |
| *H04L 51/212* | (2022.01) | |
| *H04L 51/48* | (2022.01) | |

(52) U.S. Cl.
CPC .......... *H04L 63/1483* (2013.01); *G06V 10/74* (2022.01); *G06V 30/19* (2022.01); *H04L 51/21* (2022.05)

(58) Field of Classification Search
CPC ..... H04L 63/1483; H04L 51/21; G06V 30/19; G06V 10/74
See application file for complete search history.

(56) References Cited

U.S. PATENT DOCUMENTS

| | | | | |
|---|---|---|---|---|
| 10,755,095 | B1* | 8/2020 | Cunningham | G06Q 30/0185 |
| 10,999,322 | B1* | 5/2021 | Yuan | G06F 16/583 |
| 11,729,211 | B2* | 8/2023 | Jakobsson | H04L 63/1483 |
| | | | | 726/23 |
| 2006/0259561 | A1* | 11/2006 | Takahashi | H04L 67/5651 |
| | | | | 709/206 |
| 2019/0319905 | A1* | 10/2019 | Baggett | H04L 51/212 |
| 2019/0387004 | A1* | 12/2019 | Parekh | H04L 63/105 |

(Continued)

OTHER PUBLICATIONS

Panda, et al., "A Novel Logo Identification Technique for Logo-Based Phising Detection in Cyber-Physical Systems", MDPI, Publisehd on Aug. 15, 2022, 17 pages.

*Primary Examiner* — Oleg Survillo
(74) *Attorney, Agent, or Firm* — Lee & Hayes, P.C.

(57) ABSTRACT

Techniques are described herein for detecting an authorization status for an email based on content included in that email. In embodiments, such techniques may comprise receiving an electronic communication associated with an origination address, identifying, within the electronic communication, information indicating a claimed source entity, determining, based on the information, a claimed source entity, determining a number of authorized addresses associated with the claimed source entity, determining whether the electronic communication is authorized by the claimed source entity based on whether the origination address is included within the number of authorized addresses, updating the electronic communication to include an indication of whether the electronic communication is authorized by the claimed source entity, and transmitting the electronic communication to its intended recipient.

20 Claims, 7 Drawing Sheets

(56) References Cited

U.S. PATENT DOCUMENTS

| | | | |
|---|---|---|---|
| 2020/0067976 A1* | 2/2020 | Jakobsson | H04L 63/1483 |
| 2021/0097119 A1* | 4/2021 | Komada | G06F 16/9535 |
| 2021/0112024 A1 | 4/2021 | Everton | |
| 2021/0152565 A1* | 5/2021 | Greevy | H04L 63/101 |
| 2021/0344711 A1 | 11/2021 | Cleveland et al. | |
| 2022/0086133 A1* | 3/2022 | Killoran, Jr. | H04L 63/0807 |
| 2022/0353242 A1 | 11/2022 | Goldstein | |
| 2023/0328034 A1* | 10/2023 | Behera | H04L 63/1408 |
| | | | 726/22 |
| 2024/0022432 A1* | 1/2024 | Spanier | H04L 9/3297 |
| 2024/0177512 A1* | 5/2024 | Gils | G06Q 20/4016 |

\* cited by examiner

TECHNIQUES FOR DETECTING AND MITIGATING SPOOFED EMAIL COMMUNICATIONS

TECHNICAL FIELD

The present disclosure relates generally to techniques for an email-security system to detect malicious email impersonating brands.

BACKGROUND

Electronic mail, or "email," continues to be a primary method of exchanging messages between users of electronic devices. Many email service providers have emerged that provide users with a variety of email platforms to facilitate the communication of emails via email servers that accept, forward, deliver, and store messages for the users. Email continues to be an important and fundamental method of communications between users of electronic devices as email provide users with a cheap, fast, accessible, efficient, and effective way to transmit all kinds of electronic data. Email is well established as a means of day-to-day, private communication for business communications, marketing communications, social communications, educational communications, and many other types of communications.

Due to the widespread use and necessity of email, scammers and other malicious entities use email as a primary channel for attacking users, such as by business email compromise (BEC) attacks, malware attacks, and malware-less attacks. These malicious entities continue to employ more frequent and sophisticated social-engineering techniques for deception and impersonation (e.g., phishing, spoofing, etc.). As users continue to become savvier about identifying malicious attacks on email communications, malicious entities similarly continue to evolve and improve methods of attack.

Accordingly, email security platforms are provided by email service providers (and/or third-party security service providers) that attempt to identify and eliminate attacks on email communication channels. For instance, cloud email services provide secure email gateways (SEGs) that monitor emails and implement pre-delivery protection by blocking email-based threats before they reach a mail server. These SEGs can scan incoming, outgoing, and internal communications for signs of malicious or harmful content, signs of social engineering attacks such as phishing or business email compromise, signs of data loss for compliance and data management, and other potentially harmful communications of data. However, with the rapid increase in the frequency and sophistication of attacks, it is difficult for email service providers to maintain their security mechanisms at the same rate as the rapidly changing landscape of malicious attacks on email communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
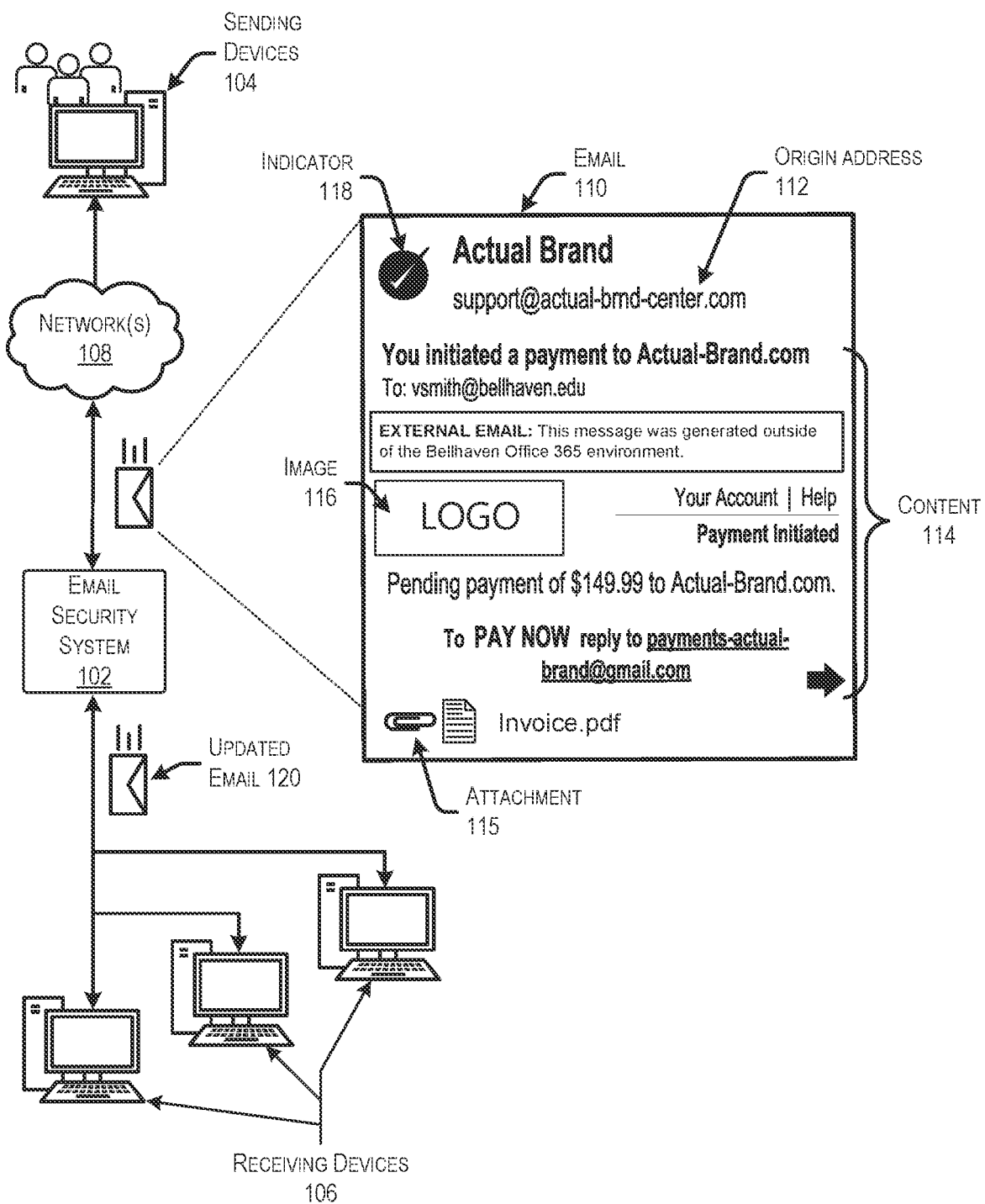
FIG. 1 illustrates a system-architecture diagram of an example email service platform configured to detect and classify an email as being potentially fraudulent.

A first method according to the techniques described herein may include, upon receiving an electronic communication associated with a sender address, identifying, within the electronic communication, information indicating a claimed source entity. The method further includes determining, based on the information, a claimed source entity, determining a number of authorized addresses associated with the claimed source entity, and determining whether the electronic communication is authorized in relation to the claimed source entity. Such a determination may be made based on whether the sender address is included within the number of authorized addresses associated with the claimed source entity. Based on whether the electronic communication is authorized in relation to the claimed source entity the method may involve including an indication of whether the electronic communication is authorized by the claimed source entity and transmitting the electronic communication to its intended recipient.

Additionally, the techniques described herein may be performed by a system and/or device having non-transitory computer-readable media storing computer-executable instructions that, when executed by one or more processors, performs the method described above.

Example Embodiments

This disclosure describes techniques that may be performed to detect, and mitigate risks for, spoofed email communications. Spoofed email communications may be communications that claim to be associated with a particular source entity that are sent without the authority of that source entity.

The described email service platform may be configured to identify scam emails, which are often are designed to impersonate legitimate brands and are sent from the attackers to facilitate the scam. For instance, an initial email may be sent from the attacker that includes a request for the target user to perform an action based on the type of scam. In this instance, the initial email may request a gift card code, may request a wire transfer, may request that salary be deposited into a different bank account, list of unpaid invoices, W-2 details of employee(s), sensitive information of clients, and so forth. Accordingly, impersonation (e.g., fraudulent) emails may need to be processed to determine the legitimacy of the email.

In the described email security system, an email is processed to determine whether the sender of the email communication had authority to send the email. To do this, the email security system identifies the sender of the email communication as well as a claimed source entity (e.g., a brand or business entity). The email security system can then access information stored in records maintained by a third-party authority (e.g., a DNS registry server) to ascertain whether the sender address is authorized to send emails on behalf of the claimed source entity. The email communication may be determined to be spoofed if a determination is made that the sender address is not authorized to send emails on behalf of the claimed source entity.

Embodiments of the disclosure provide for a number of advantages over conventional systems. For example, embodiments enable an email server to automatically identify and mark emails as potential being spoofed in a quick and unintrusive manner. In some spoofed emails, an unauthorized entity may include information about brands (e.g., logos) within an image in order to evade text-based spoofing detection. The techniques described herein use methods that are advantageous over conventional spoofed email detection techniques in that they are able to identify scenarios in which brand logos are used in an unauthorized manner, even if the email does not mention the brand outside of images included in the email.

FIG. 1 illustrates a system-architecture diagram 100 of an example email service platform configured to detect and classify an email as being potentially fraudulent. In embodiments, such an example email service platform may include an email security system 102 to operate between one or more sending devices 104 and one or more receiving devices 106 via a network 108.

In some instances, the email-security system 102 may be a scalable service that includes and/or runs on devices housed or located in one or more data centers, that may be located at different physical locations. In some examples, the email-security system 102 may be included in an email platform and/or associated with a secure email gateway platform. The email-security system 102 and the email platform may be supported by networks of devices in a public cloud computing platform, a private/enterprise computing platform, and/or any combination thereof. The one or more data centers may be physical facilities or buildings located across geographic areas that designated to store networked devices that are part of and/or support the email-security system 102. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth).

The email-security system 102 may be associated with an email service platform and may generally comprise any type of email service provided by any provider, including public email service providers (e.g., Google Gmail, Microsoft Outlook, Yahoo! Mail, AIL, etc.), as well as private email service platforms maintained and/or operated by a private entity or enterprise. Further, the email service platform may comprise cloud-based email service platforms (e.g., Google G Suite, Microsoft Office 365, etc.) that host email services. However, the email service platform may generally comprise any type of platform for managing the communication of email communications between clients or users. The email service platform may generally comprise a delivery engine behind email communications and include the requisite software and hardware for delivering email communications between users. For instance, an entity may operate and maintain the software and/or hardware of the email service platform to allow users to send and receive emails, store and review emails in inboxes, manage and segment contact lists, build email templates, manage and modify inboxes and folders, scheduling, and/or any other operations performed using email service platforms.

The email-security system 102 may be included in, or associated with, the email service platform. For instance, the email-security system 102 may provide security analysis for emails communicated by the email service platform (e.g., as a secure email gateway). Furthermore, a second computing infrastructure may comprise a different domain and/or pool of resources used to host the email service platform.

The email service platform may provide one or more email services to users of user device to enable the user devices to communicate emails. Sending devices 104 may communicate with receiving devices 106 over one or more networks 108, such as the Internet. In some instances, the network(s) 108 may generally comprise one or more networks implemented by any viable communication technology, such as wired and/or wireless modalities and/or technologies. The network(s) 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 108 may include devices, virtual resources, or other nodes that relay packets from one device to another.

As illustrated, the user devices may include the sending devices 104 that send emails and the receiving devices 106 that receive the emails. The sending devices 104 and receiving devices 106 may comprise any type of electronic device capable of communicating using email communications. For instance, the devices 104/106 may include one or more of different personal user devices, such as desktop computers, laptop computers, phones, tablets, wearable devices, entertainment devices such as televisions, and/or any other type of computing device. Thus, the user devices 104/106 may utilize the email service platform to communicate using emails based on email address domain name systems according to techniques known in the art.

The email service platform may receive emails that are destined for the receiving device 106 that have access to inboxes associated with destination email addresses managed by, or provided by, the email service platform. That is, emails 110 are communicated over the network(s) 108 to one or more recipient servers of the email service platform, and the email service platform determines which registered user the email is intended for based on email information included in a header, such as "To," "Cc," Bcc," and the like. In instances where a user of the receiving device 106 has registered for use of the email-security system 102, an organization managing the user devices 104/106 has registered for use of the email-security system 102, and/or the email service platform itself has registered for use of the email-security system 102, the email service platform may provide the appropriate emails to the front end for pre-preprocessing of the security analysis process.

In embodiments, the email security system 102 is configured to process an email 110 received from a sending device 104 to detect and provide an indication of spoofed emails. In these embodiments, the email security system 102 may be configured to identify a claimed source of origin (e.g., a business or other entity) for the email 110 in order to ascertain whether the sender of that email was authorized to send the email on behalf of the claimed source of origin. Based on such a determination, the email security system 102 may be configured to update the email to include an indication of whether that email is authentic.

When processing the email 110, the email security system 102 is configured to identify an origin address 112. The origin address 112 represents a point of origin for the email, in that it indicates an account from which the email was sent. In one example, the origin address 112 may be obtained from a header of the email 110. In another example, the origin address 112 may be obtained from a return-path address as indicated in information received in relation to the email 110. In some cases, the origin address 112 may be made up of a user identifier and an internet domain identifier. In some cases, the origin address 112 may be an internet protocol (IP) address.

Additionally, the email security system 102 is configured to identify content 114 within a body and or an attachment of the email 110. Such content 114 may include a combination of text and/or images 116 that form a message to an intended recipient of the email 110. The security system 102 is configured to determine, based on the content 114, a claimed source of the email 110. For example, an image 116 may be assessed by the security system 102 to determine the claimed source of the email. In this example, the image 116 may be subjected to one or more machine learning models to determine a company or other organization represented by a logo or other depiction within the image 116. In some cases, a determination of the claimed source of the email may be determined based on a context or semantics identified for the content 114.

In some cases, an email 110 may further include an attachment 115. Such an attachment might include any suitable computer-readable document that is sent along with (e.g., attached to) an email communication. In some embodiments, the email security system 102 may be configured to open, or otherwise access, content included within an attachment 115 during performance of the techniques described herein. In some cases, an attachment may include a combination of text and/or image data. In embodiments in which an attachment 115 includes text data, such text data may be parsed by the email security system 102. In embodiments in which an attachment 115 includes image data, one or more computer vision techniques (e.g., optical character recognition) may be used to identify information included in the attachment.

Upon determining a claimed source of origin for the email 110 based on the content 114 of the email, the email security system 102 is configured to determine whether the sender of the email (as determined based on the origin address 112) is authorized to send email communications on behalf of the claimed source of origin. To do this, the email security system 102 may be configured to access information stored by a remote server device, such as a domain registry server. The information may include a list of entities (e.g., as indicated via a domain) that are authorized to send emails on behalf of the claimed source. In some cases, the information may further delineate which entities are authorized not only to send emails associated with a particular entity, but also which logos and/or images each entity is authorized to use. This is described in greater detail elsewhere.

Upon determining whether the sender of the email is authorized to send email communications on behalf of the claimed source of origin, the email security system 102 may be configured to update the email 110 to include an indicator 118 that provides an indication as to whether the email 110 is an authorized email in relation to the claimed source of origin. Once the email 110 has been updated to include such an indicator 118, the updated email 120 may then be routed to the intended recipient (e.g., receiving device 106).

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
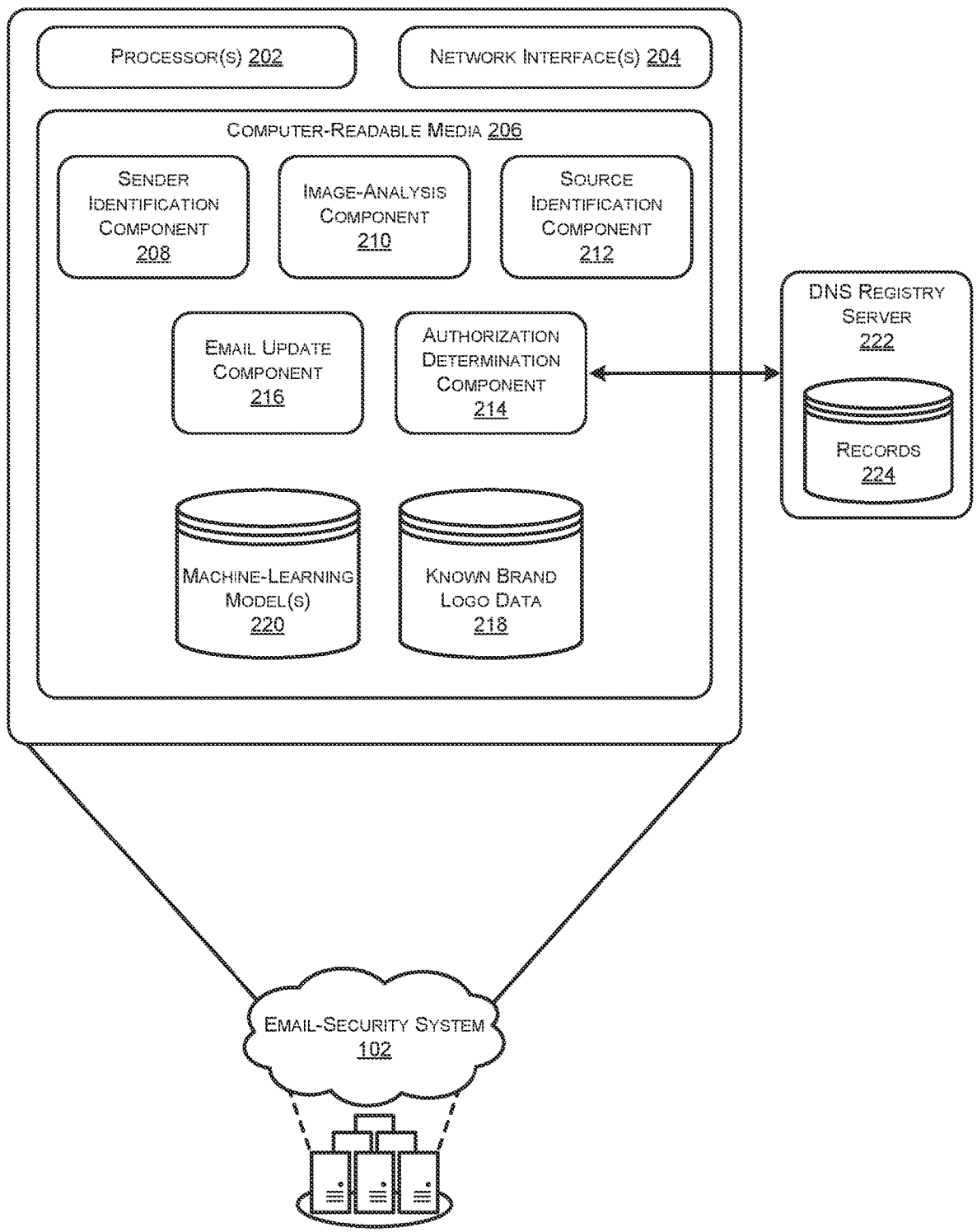
FIG. 2 depicts a component diagram of an example email-security system that detects and classifies an email indicating whether the email was authorized by a claimed source entity.

FIG. 2 depicts a component diagram 200 of an example email-security system 102 that detects and classifies an email indicating whether the email was authorized by a claimed source entity. As illustrated, the email-security system 102 may include one or more hardware processors 202 (processors), one or more devices, configured to execute one or more stored instructions. Such processor(s) 202 may comprise one or more processing cores. Further, the email-security system 102 may include one or more network interfaces 204 configured to provide communications between the email-security system 102 and other devices, such as the sending device(s) 104, receiving devices 106, and/or other systems or devices associated with an email service providing the email communications. The network interfaces 204 may include devices configured to couple to a network 108, which might include personal area networks (PANs), wired and wireless local area networks (LANs), wired and wireless wide area networks (WANs), and so forth. For example, the network interfaces 204 may include devices compatible with Ethernet, WiFi™, and so forth.

The email-security system 102 may also include computer-readable media 206 that stores various executable components (e.g., software-based components, firmware-based components, etc.). The computer-readable-media 206 may store components to implement functionality described herein. While not illustrated, the computer-readable media 206 may store one or more operating systems utilized to control the operation of the one or more devices that comprise the email-security system 102. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 206 may include portions, or components, that configure the email-security system 102 to perform various operations described herein. For example, the computer-readable media 206 may include some combination of a sender identification component 208 configured to identify a sender of an email communication, an image analysis component 210 configured to provide analysis of images included in an email communication, a source identification component 212 configured to identify a claimed source entity of an email, an authorization determination component 214 configured to determine whether the sender of the email communication is authorized to send emails on behalf of a source entity, and/or an email update component 216 configured to update an email communication to include an indication of authorization. Additionally, the computer-readable media 206 may include information included in one or more databases. For example, the computer-readable media 206 may further include one or more machine learning model(s) 220) trained to correlate email content with a claimed source entity and/or a database of known brand logo data 218 that includes information about various brand names/brand logo images.

A sender identification component 208 may be configured to, when executed by the processor(s) 202, perform various techniques for identifying a sender address to be associated with an email communication. In some embodiments, the sender address may be identified as one or more of a "Display Name" and "From," "To", "Cc," and/or "Bcc" email addresses of the email communication. The sender identification component 208 may be further configured to determine whether each of these addresses are associated with legitimate brand names, email addresses, and/or email domains and/or free email service email addresses and/or email domains. In some cases, the sender identification component 208 is configured to determine the sender address based on information about a return-path address associated with the email communication. In some cases, the sender identification component 208 is configured to determine the sender address based on a link or other reference associated with an interactive element included within the email communication. For example, a button that can be selected to complete a payment may include a URL or other reference to a website domain. In this example, the sender address may be determined to be associated with the website domain.

An image analysis component 210 may be configured to, when executed by the processor(s) 202, perform various techniques for analyzing images within an email communication. For instance, the image analysis component 210 may be configured to, when executed by the processor(s) 202, perform various techniques for analyzing images included within email communications. In one example, such techniques may include optical character recognition techniques that can be used to identify text included within the one or more images. In another example, such techniques may include computer vision techniques that are used to compare the image in an email with known images (e.g., known brand logo data 218).

A source identification component 212 may be configured to, when executed by the processor(s) 202, perform various techniques for determining a claimed source entity of an email communication. In embodiments, the source identification component 212 may be configured to determine whether the email communication is claiming to have originated from, or be associated with, a claimed source entity such as a brand or domain. Such a determination may be made based on the usage of brand names or logos within the email communication as well as a context in which the brand name or logo is used. For example, a determination may be made that an email communication is claiming to be associated with a source entity based on the presentation of an image that includes a logo for that source entity within the body of the email and/or within an attachment of the email. Alternatively, such a determination may be made based on the inclusion of the brand name or logo in a signature of the email. In some embodiments, the source identification component 212 may be configured to identify brand names within an email communication. Upon identifying such brand names within the email, the source identification component 212 may be configured to determine whether the email claims the brand name as a source based on a context (e.g., a position and/or semantics) in which the brand name is presented.

In some embodiments, the source identification component 212 may use one or more trained machine-learning models 220 to identify a claimed source entity. In such embodiments, some portion of the content of the body and/or attachment of the email communication may be provided as input to the one or more trained machine-learning models 220, which may then output an indication of a likelihood that a source entity referenced in the email communication is a claimed source entity.

An authorization determination component 214 may be configured to, when executed by the processor(s) 202, perform various techniques for determining whether the sender of the email communication is authorized to send emails on behalf of a claimed entity source. To do this, the authorization determination component 214 may communicate with a DNS registry server 222. More particularly, upon identifying a claimed source entity (e.g., via the source identification component 212) for the email, the authorization determination component 214 may be configured to retrieve records 224 (e.g., SPF records) maintained by the DNS registry server 224 in relation to the claimed source entity. Based on these records, the authorization determination component 214 is configured to identify a set of addresses that are authorized to send emails on behalf of the claimed source entity. Upon identifying this set of addresses, the authorization determination component 214 makes a determination as to whether the email is an authorized email based on whether the sender address identified by the sender identification component 208 is included in the determined set of addresses.

In some embodiments, the records 224 maintained by a DNS registry server 222 may include an indication of which addresses (e.g., domains) are authorized to send emails on behalf of a source entity. In some embodiments, the records 224 maintained by a DNS registry server 222 may include an indication of which addresses are authorized to send emails that include particular images (e.g., images of a brand logo) associated with the source entity.

An email update component 216 may be configured to, when executed by the processor(s) 202, perform various techniques for providing an indication that the email is, or is not, authorized to be sent by the sender address. In the scenario in which the email communication is determined to be authorized, the email update component 216 may be configured to add a marking (such as a logo or watermark) indicating that the email is an authorized email. In the scenario in which the email communication is determined not to be authorized, the email update component 216 may be configured to add a notification indicating that the email is likely not an authorized email (e.g., the email may be a spoof email).

Figure 3:
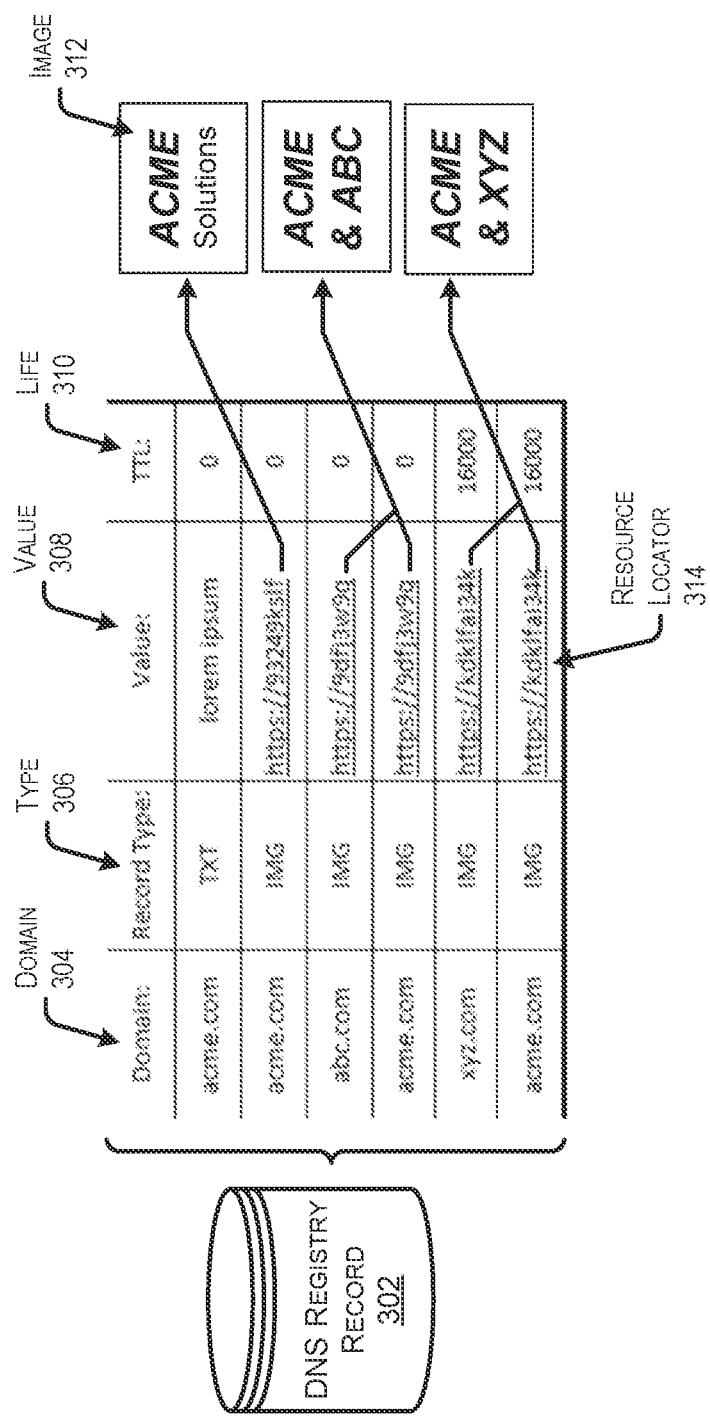
FIG. 3 depicts an example of a domain name system (DNS) registry record that includes a number of sender policy frameworks (SPF) that may be implemented in according to at least some embodiments.

FIG. 3 depicts an example of a domain name system (DNS) registry record that includes a number of sender policy frameworks (SPF) that may be implemented in according to at least some embodiments. For the purposes of the disclosure, an SPF may be any suitable indication of authorization of an entity (e.g., as represented by a domain) to send communications on behalf of a source entity. In one example, an SPF is a line of text included in a DNS registry and used to indicate to mail exchanges which hosts are authorized to send mail for a source entity (as represented by a domain). An exemplary DNS registry may include multiple SPFs, each represented as a separate line of text.

As depicted, a DNS registry record 302 may include a number of SPF records associated with a particular source entity. Such a source entity may be any suitable type of entity, including an individual, a business entity, or another type of organization. In some cases, source entities may be grouped and/or identified based on ownership of a domain. For example, an owner of the website domain example.com might be defined as the source entity for any communication purporting to originate from somewhere within that domain. In some embodiments, information to be included in a DNS registry record 302 (e.g., SPF records) is provided to an operator of the DNS registry by an administrator of the domain.

In embodiments, each SPF record within the DNS registry record 302 for a source entity may include a number of data fields. For example, an SPF record may include a domain field 304 that is populated with an indication of one or more entities (e.g., as represented via domains) that have authority to send communications corresponding to the rest of the SPF record. In another example, an SPF record may include a type field 306 that is populated with an indication of what type (e.g., category) of authorization the SPF record pertains to. By way of illustration, the type field may be populated with an indication of whether the SPF record relates to text or an image. In another example, an SPF record may include a value field 308 that is populated with an indication of a value that relates to the SPF record. In another example, an SPF record may include a life field 306 that is populated with an indication of a period over which the SPF record is valid.

In embodiments, the DNS registry record 302 may be configured to provide information about entities that are authorized to use particular images 312 (e.g., logos). In some cases, the image 312 (or a representation of such) may be included in the value field 308 of an SPF record. For example, the value field 308 may be populated with text that represents a bitmap of the image 312. In other cases, the SPF record may include a reference to a location in memory at which the image 312 is stored. For example, the SPF record may include a resource locator 314 (e.g., a URL or other suitable locator reference) that references a location in memory at which the respective image 314 is stored.

In some embodiments, the DNS registry may be configured to verify an ownership interest in an image received from, and stored in relation to, a source entity. Any suitable technique for performing such ownership authentication may be performed. For example, an ownership interest may be verified by a third-party service provider, such as a certification authority.

By way of illustration, a source entity may obtain a verified mark certificate (VMC) for a logo that is trademarked by the source entity. In this illustrative example, a VMC authority verifies that the source entity is the legal owner of the provided brand logo based on the existing trademark. Using a VMC helps prevent spammers and other malicious users from using brand logos that they don't own. A logo that is a registered trademark is harder to spoof, or forge, because it's verified by a trademark organization. Note that currently the Brand Indicators for Message Identification (BIMI) standard requires a logo to be a registered trademark prior to obtaining a VMC for that logo. When a VMC is issued for a logo or other image, that VMC can be verified using cryptographic keys. For example, an image provided by a source entity to a DNS registry may include a digital signature that can be used to authenticate that the source entity is authorized to use the image. For example, the source entity may digitally sign the image using a private cryptographic key associated with the source entity. Ownership of the image can then be verified based on the digital signature using a public key known to be associated with the source entity.

Figure 4:
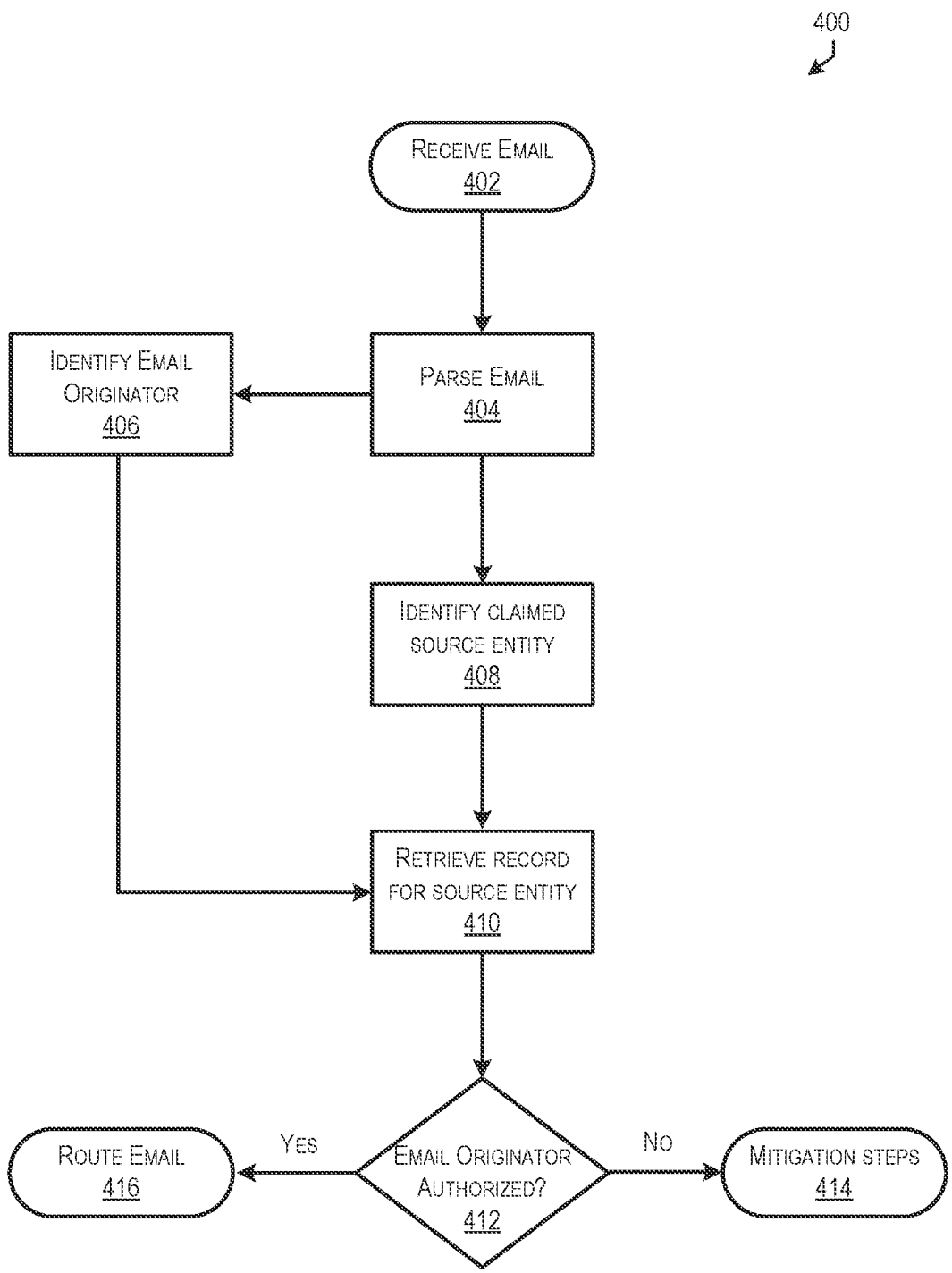
FIG. 4 depicts a block diagram illustrating an example process for determining whether an email received from a sender is authorized to be sent by that sender in accordance with at least some embodiments.

FIG. 4 depicts a block diagram illustrating an example process for determining whether an email received from a sender is authorized to be sent by that sender in accordance with at least some embodiments. The process 400 is performed by an email security system (e.g., the email security system 102 as described in relation to FIG. 1) upon receiving an email communication.

At 402, the process 400 may involve receiving, at an email security system, an electronic communication from a first computing device and associated with an email account. As noted elsewhere, such an electronic communication might include an email communication. In some embodiments, the email security system may be implemented on an edge device of a local network (e.g., acting as an ingress/egress to the local network), such that emails directed toward computing devices operating on the local network are received and processed by the email security system. In some embodiments, the email security system is implemented on an email exchange server configured to route email communications between accounts/computing devices.

At 404, the process 400 may involve parsing the email communication to identify a number of elements within that email communication. Particularly, the process 400 may involve identifying, based on information included in the email, an email originator as described in greater detail at 406 as well as a claimed source entity as described in greater detail at 408.

At 406, the process 400 may involve determining an email originator for the email communication based on information included in the email. In some embodiments, the email originator may be determined based on a sender email address included in the email communication (e.g., as included within a header of the email communication). In some embodiments, the email originator may be determined based on a return-path address as indicated in information received in relation to the email. In general, a return path is used to specify where bounced emails are sent and is included within the header of an email communication. A return-path address may be a hidden Simple Mail Transfer Protocol (SMTP) address that is separate from the sender email address.

At 408, the process 400 may involve identifying a claimed source entity to be associated with the email communication. In some embodiments, this may involve parsing the contents of the email communication (as included in some combination of the header, body, and/or an attachment). The parsed content, or at least a portion thereof, may then be provided to one or more software components that is configured to determine a source entity being claimed by the email communication. In some embodiments, this may involve identifying brand names within text of the email communication and determining (e.g., using natural language processing and/or sentiment analysis) that those brand names are being claimed as a source of the email communication. In some embodiments, this may involve identifying one or more images included within the email communication and further identifying a brand that can be attributed to those images (e.g., using one or more computer vision and/or optical character recognition techniques). In these embodiments, a determination may be made as to whether a source entity (e.g., a brand) attributed to an image is being claimed as a source of the email communication. For example, a position and/or size of the image in relation to the email body and/or attachment may indicate that the entity associated with the image is being claimed as a source entity.

At 410, the process 400 may involve, upon identifying a claimed source entity for the email communication, retrieving records indicating authorization for emails associated with the claimed source entity. For example, the email security system may communicate with a domain name system (DNS) registry to obtain a number of SPF records that pertain to the claimed source entity. More particularly, the SPF records may include a list of entities that are authorized to send emails associated with the claimed source entity. As noted elsewhere, such SPF records may include information that in a text-based format or an image-based format.

In some embodiments, the information about a particular image is compared to image information stored in relation to one or more source entities within SPF records (e.g., the two images are compared using one or more computer vision techniques). Upon determining that the image and the image information of the SPF record are likely a match (e.g., a similarity score is greater than a threshold similarity value), information about the entity/entities authorized to use the image information is extracted from the SPF record. In some embodiments, authorization for the use of an image may be determined based on a reference (e.g., a URL or other suitable reference) to that image. For example, images included within an email communication may be included using a reference to a location in memory at which the image is stored. In these embodiments, the reference to the memory location at which the image is stored may be included in an SPF record.

At 412, the process 400 may involve making a determination as to whether the originator of the email is authorized to send the email communication. More particularly, such a determination may be made based on whether the sender email address as determined at 406 is within a list of authorized entities determined to be authorized to send the email communication. In these embodiments, a set of authorized entities (which may be identified based on a domain) is identified that are listed within one or more SPF records as being authorized. In embodiments in which the SPF records include information in an image-based format, the SPF records may include an indication of which particular entities are authorized to use (e.g., send emails that include) a particular image (e.g., a logo). Upon identifying a set of authorized entities, a determination as to whether the email originator is authorized to send the email communication is made based on whether the sender email address is within the set of authorized entities.

Upon a determination that the email originator was not authorized to send the email communication (e.g., "No" at step 412), the process 400 may further involve taking one or more mitigation steps at 414. Such mitigation steps may include any suitable method of limiting exposure of the email's recipient to fraud or other risk. For example, mitigation steps may involve blocking, or otherwise preventing routing of, the email communication by preventing the email communication from being transmitted to the intended recipient. In another example, mitigation steps may involve adding an indicator to the email that conveys that the sender of the email was likely not authorized to send the email communication. Such an indicator may take any suitable form.

Upon a determination that the email originator was authorized to send the email communication (e.g., "Yes" at step 412), the process 400 may further involve routing the email to its intended recipient at 416. In some embodiments, the email security system may be further configured to update the email to include some indicator that the email sender is authorized. For example, the email security system may add an image or other indicator to the email to certify the authenticity of the email before routing that email to the intended recipient.

Figure 5:
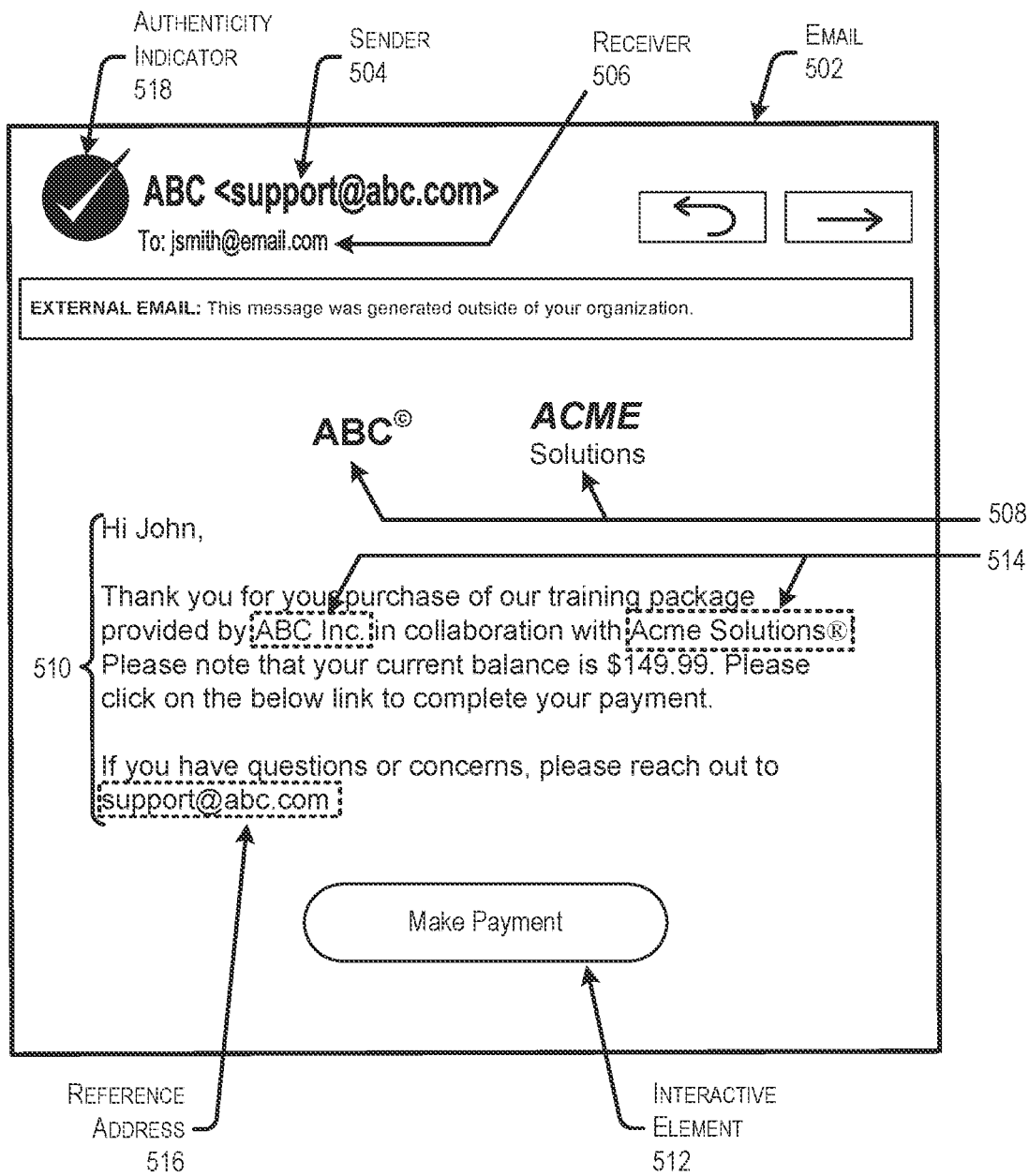
FIG. 5 depicts various elements of an exemplary email that may be processed using an email security system as described herein in accordance with at least some embodiments.

FIG. 5 depicts various elements of an exemplary email that may be processed using an email security system as described herein in accordance with at least some embodiments. As described elsewhere, an email security system (e.g., email security system 102 as described in relation to FIG. 1) may receive an email 502. Such an email 502 may include at least a header and a body and/or attachment.

An exemplary header for an email 502 may include an indication of a sender account 504 and a receiver account 506, which may be included in a header. It should be noted that a sender address might be identified at least in part based on the sender account 504 indicated within the header.

An exemplary body for an email 502 may include a number of elements. Particularly, a body for an email may include one or more images 508, textual information 510, and one or more interactive elements 512. Note that while content is described herein as being obtained from a body of the email 502, such content may also be obtained from an attachment associated with the email 502.

As noted elsewhere, the images 508 may include logos or other representations of a source entity (e.g., a brand). In these cases, the position of the image(s) within the body (or attachment) of the email 502 may be used to make a determination as to whether the email is claiming to be associated with the source entity depicted in such an image. For example, if the image of a brand logo is positioned at the top and center of an email body, then a determination may be made that the email is likely claiming to be associated with the brand. In another example, if the image of a brand logo is positioned in a signature position of an email body, then a determination may also be made that the email is likely claiming to be associated with the brand.

Textual information 510 included in an email may include a number of words and/or phrases that can be used to make a determination as to whether the email is claiming to be associated with a source entity. In some embodiments, such a determination may be made by detecting brand use 514 within the textual information and assessing a context in which the brand use 514 is presented. In some cases, brand use 514 may be identified by comparing words and/or phrases to a list of known brand names. In some cases, a brand use 514 may be identified based on a format in which it is presented within the textual information 510. For example, a word and or phrase may be identified as a potential brand use 514 if it is capitalized and/or followed by a copyright or trademark symbol (e.g., @ or R). In some cases, the textual information may include an indication of a referenced address 516 or other type of indication of a potential claimed source entity or a potential sender address.

Interactive elements 512 included in an email may include buttons or other interaction mechanisms that allow a user to quickly interact with information presented in the email. In some case, while it may not be readily visible to a user that is reading the email, such an interactive element 512 may be associated with a link (e.g., a URL or other reference) that is accessed upon interaction with the interactive element 512. In these embodiments, a website or domain associated with such a link may be used to identify a potential claimed source entity or a potential sender address.

In some embodiments, an email security system may be configured to update the email to include one or more elements. For example, in some embodiments, the email security system may be configured to add an authenticity indicator 518 to the email 502 that indicates whether the email is determined to have been sent by an entity that is authorized to send emails on behalf of a claimed source entity determined from the content of the email 502.

Figure 6:
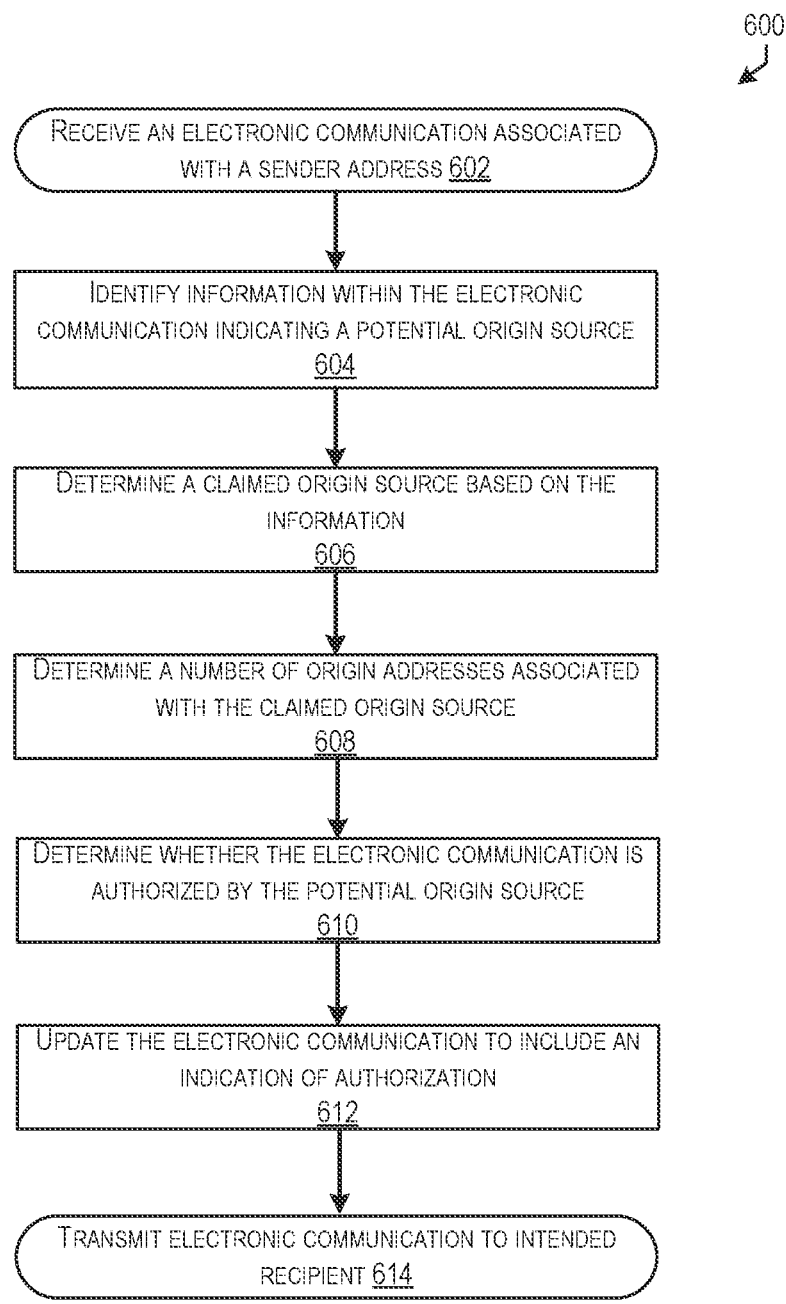
FIG. 6 depicts a flow diagram illustrating an exemplary process for identifying and indicating authorization for an email communication in accordance with at least some embodiments.

FIG. 6 depicts a flow diagram illustrating an exemplary process for identifying and indicating authorization for an email communication in accordance with at least some embodiments. The process 600 may be performed by an email security system, such as the email security system 102 as described in relation to FIG. 1 above.

At 602, the process 600 may involve receiving an electronic communication associated with an origination address. In some embodiments, the origination address is determined from one of a sender address included in a header of the email communication or a return-path address for the email communication. As noted elsewhere, an email may originate from a sender account and may be directed to a receiver account.

At 604, the process 600 may involve identifying, within the electronic communication, information indicating a claimed source entity. In some embodiments, the claimed source entity is determined based on information included in one or more images included in the electronic communication. For example, the one or more images included in the electronic communication may be determined to correspond to a logo for a brand entity. In this example, the claimed source entity may be the brand entity depicted in the images. In some cases, the claimed source entity may be determined from the image included in the email communication by comparing the image to known logo information stored by the email security system in relation to a number of brands. In some cases, the claimed source entity may be determined from the image included in the email communication using computer vision techniques such as optical character recognition (OCR). In some embodiments, the claimed source entity is determined based on information included as text in a body or attachment of the email communication. For example, the claimed source entity may be determined to be a brand entity based on a context in which a reference to the brand entity is presented within the text. At 606, the process 600 may involve determining, based on the information, a claimed source entity.

At 608, the process 600 may involve determining a number of authorized addresses associated with the claimed source entity. In some embodiments, the number of authorized addresses associated with the claimed source entity is determined by communicating with at least one second computing device. For example, the at least one second computing device may be a Domain Name Service (DNS) registry server. In this example, the number of authorized addresses may be determined based on sender policy frameworks (SPF) stored by the DNS registry server in relation to the claimed source entity.

At 610, the process 600 may involve determining whether the electronic communication is authorized by the claimed source entity based on whether the sender address is included within the number of authorized addresses. In some embodiments, the information indicating the claimed source entity is obtained from an image included in the email communication. In these embodiments, the number of authorized addresses indicates entities authorized to use the image. For example, the DNS record may delineate which entities (as indicated via a respective origin address) are authorized to use a particular logo associated with a source entity (e.g., a brand).

At 612, the process 600 may involve updating the electronic communication to include an indication of whether the electronic communication is authorized by the claimed source entity. In some embodiments, this may involve adding an image or watermark to the email communication that indicates an authorization status. At 614, the process 600 may involve transmitting the electronic communication to its intended recipient.

Figure 7:
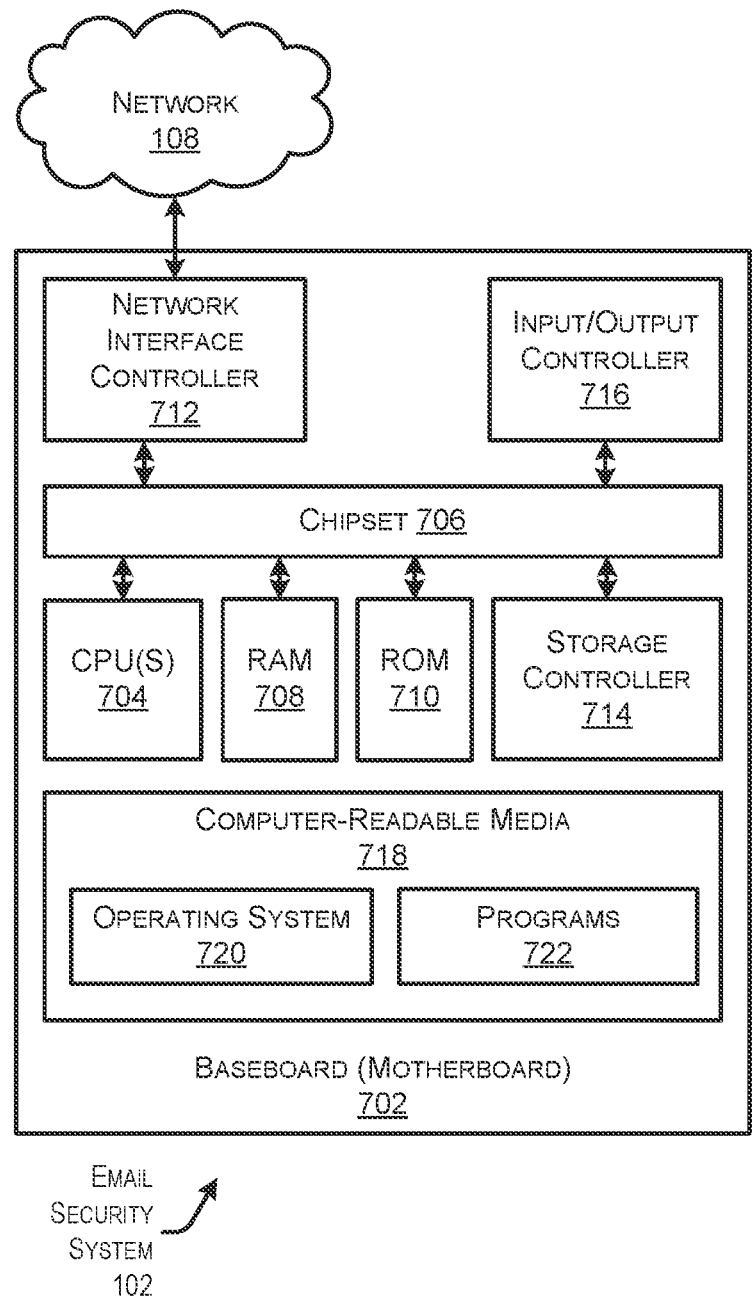
FIG. 7 shows an example computer architecture for an email security system capable of executing program components for implementing the functionality described above.

FIG. 7 shows an example computer architecture for an email security system 102 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The email security system 102 may, in some examples, correspond to a physical server as described herein, and may comprise networked devices such as servers, switches, routers, hubs, bridges, gateways, modems, repeaters, access points, etc.

The email security system 102 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the email security system 102.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 702. The chipset 706 can further provide an interface to a computer-readable storage medium such as a read-only memory ("ROM") 710 or non-volatile RAM ("NVRAM") for storing basic routines that help to startup the email security system 102 and to transfer information between the various components and devices. The ROM 710 or NVRAM can also store other software components necessary for the operation of the email security system 102 in accordance with the configurations described herein.

The email security system 102 can operate in a networked environment using logical connections to remote computing devices and computer systems through a network, such as the network 108. The chipset 706 can include functionality for providing network connectivity through a NIC 712, such as a gigabit Ethernet adapter. The NIC 712 is capable of connecting the email security system 102 to other computing devices over the network 108. It should be appreciated that multiple NICs 712 can be present in the email security system 102, connecting the computer to other types of networks and remote computer systems.

The email security system 102 can be connected to a storage device 718 that provides non-volatile storage for the computer. The storage device 718 can store an operating system 720, programs 722, and data, which have been described in greater detail herein. The storage device 718 can be connected to the email security system 102 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The email security system 102 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the email security system 102 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The email security system 102 can further read information from the storage device 718 by detecting the physical states or characteristics of one or more particular locations within the physical storage units.

In addition to the mass storage device 718 described above, the email security system 102 can have access to other computer-readable storage media to store and retrieve information, such as program modules, data structures, or other data. It should be appreciated by those skilled in the art that computer-readable storage media is any available media that provides for the non-transitory storage of data and that can be accessed by the email security system 102. In some examples, the operations performed by devices as described herein may be supported by one or more devices similar to email security system 102. Stated otherwise, some or all of the operations performed by an edge device, and/or any components included therein, may be performed by one or more computer devices 102 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the email security system 102. According to one embodiment, the operating system comprises the LINUX operating system. According to another embodiment, the operating system comprises the WINDOWS®: SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the email security system 102.

In one embodiment, the storage device 718 or other computer-readable storage media is encoded with computer-executable instructions which, when loaded into the email security system 102, transform the computer from a general-purpose computing system into a special-purpose computer capable of implementing the embodiments described herein. These computer-executable instructions transform the email security system 102 by specifying how the CPUs 704 transition between states, as described above. According to one embodiment, the email security system 102 has access to computer-readable storage media storing computer-executable instructions which, when executed by the email security system 102, perform the various processes described above with regard to the other figures. The email security system 102 can also include computer-readable storage media having instructions stored thereupon for performing any of the other computer-implemented operations described herein.

The email security system 102 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the email security system 102 might not include all of the components shown in FIG. 7, can include other components that are not explicitly shown in FIG. 7, or might utilize an architecture completely different than that shown in FIG. 7.

As described herein, the email security system 102 may include one or more hardware processors 704 (processors) configured to execute one or more stored instructions. The processor(s) 704 may comprise one or more cores. Further, the email security system 102 may include one or more network interfaces configured to provide communications between the email security system 102 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 108. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 722 may comprise any type of programs or processes to perform the techniques described in this disclosure. The programs 722 may comprise any type of program that cause the computing device 102 to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, PE Module may also include computer executable instructions that, when executed by processor(s), cause computing device 102 to perform the techniques described herein. To do so, in some embodiments, PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, PE Module may employ one or more supervised, unsupervised, or semi-supervised machine learning models. Generally, supervised learning entails the use of a training set of data, as noted above, that is used to train the model to apply labels to the input data. For example, the training data may include sample input data that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANS (SD-WANs), traffic between individual sites is sent over tunnels. The tunnels are configured to use different switching fabrics, such as MPLS, Internet, 4G or 5G, etc. Often, the different switching fabrics provide different quality of service (QOS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   maintaining multiple registry records, individual registry records of the multiple registry records including associations between at least one image and at least one source entity, individual images of the multiple images associated with one or more source entity of the at least one source entity;
   receiving, by a service provider computing device, an electronic communication associated with an origination address;
   identifying, by the service provider computing device within the electronic communication, image information indicating a claimed source entity;
   determining, by the service provider computing device using one or more computer vision and/or optical character recognition techniques a claimed source entity from the multiple source entities;
   retrieving, an individual registry record of the multiple registry records associated with the claimed source entity;
   determining, by the service provider computing device based on comparing the image information to the at least one image of the individual registry record, a number of authorized addresses associated with the claimed source entity;
   determining, by the service provider computing device, whether the electronic communication is authorized by the claimed source entity based on whether the origination address is included within the number of authorized addresses;
   updating, by the service provider computing device, the electronic communication to include an indication of whether the electronic communication is authorized by the claimed source entity; and
   transmitting, by the service provider computing device, the electronic communication to its intended recipient.

2. The method of claim 1, wherein the image information comprises one or more images included in the electronic communication.

3. The method of claim 2, wherein the one or more images included in the electronic communication are determined to correspond to a logo for a brand entity, the claimed source entity determined to be the brand entity.

4. The method of claim 1, wherein the claimed source entity is further determined based on information included as text in a body of the electronic communication.

5. The method of claim 4, wherein the claimed source entity is determined to be a brand entity based on a context in which a reference to the brand entity is presented within the text.

6. The method of claim 1, wherein the origination address is determined from one of a sender address included in a header of the electronic communication or a return-path address for the electronic communication.

7. The method of claim 1, wherein the number of authorized addresses associated with the claimed source entity is determined by communicating with at least one second computing device.

8. The method of claim 7, wherein the at least one second computing device comprises a Domain Name Service (DNS) registry server.

9. The method of claim 8, wherein the number of authorized addresses are determined based on sender policy frameworks (SPF) stored by the DNS registry server in relation to the claimed source entity.

10. The method of claim 1, wherein an individual registry record of the multiple registry records further include an indication of a period of time over which the individual registry record is valid.

11. An email security system comprising:
    one or more processors; and
    one or more non-transitory computer-readable media storing computer-executable instructions that, when executed by the one or more processors, cause the email security system to perform operations comprising:
       maintaining multiple registry records, individual registry records of the multiple registry records including associations between at least one image and at least one source entity, individual images of the multiple images associated with one or more source entity of the at least one source entity;
       receiving an electronic communication associated with an origination address;
       identifying, within the electronic communication, image information indicating a claimed source entity;
       determining, using one or more computer vision and/or optical character recognition techniques, a claimed source entity from the multiple source entities;
       retrieving, an individual registry record of the multiple registry records associated with the claimed source entity;

determining, based on comparing the image information to the at least one image of the individual registry record, a number of authorized addresses associated with the claimed source entity;

determining whether the electronic communication is authorized by the claimed source entity based on whether the origination address is included within the number of authorized addresses;

updating the electronic communication to include an indication of whether the electronic communication is authorized by the claimed source entity; and transmitting the electronic communication to its intended recipient.

12. The email security system of claim 11, wherein updating the electronic communication to include the indication comprises adding an image or watermark to the electronic communication that indicates an authorization status.

13. The email security system of claim 11, wherein the image information comprises an image included in the electronic communication, and the number of authorized addresses indicates entities authorized to use the image.

14. The email security system of claim 13, wherein the image information is determined from the image included in the electronic communication using one or more optical character recognition techniques.

15. The email security system of claim 11, wherein the number of authorized addresses correspond to the at least one image in the individual registry record.

16. The email security system of claim 11, wherein the number of authorized addresses associated with the claimed source entity is determined by communicating with a DNS registry server.

17. One or more non-transitory computer-readable media storing computer-executable instructions that, when executed by one or more processors, cause the one or more processors to perform operations comprising:

maintaining multiple registry records, individual registry records of the multiple registry records including associations between at least one image and at least one source entity, individual images of the multiple images associated with one or more source entity of the at least one source entity;

receiving an electronic communication associated with an origination address;

identifying, within the electronic communication, image information indicating a claimed source entity;

determining, using one or more computer vision and/or optical character recognition techniques, a claimed source entity from the multiple source entities;

retrieving, an individual registry record of the multiple registry records associated with the claimed source entity;

determining based on comparing the image information to the at least one image of the individual registry record, a number of authorized addresses associated with the claimed source entity;

determining whether the electronic communication is authorized by the claimed source entity based on whether the origination address is included within the number of authorized addresses;

updating the electronic communication to include an indication of whether the electronic communication is authorized by the claimed source entity; and transmitting the electronic communication to its intended recipient.

18. The one or more non-transitory computer-readable media of claim 17, wherein the image information comprises one or more images corresponding to a logo for a brand entity included in the electronic communication, and wherein the claimed source entity is determined to be the brand entity.

19. The one or more non-transitory computer-readable media of claim 17, wherein the claimed source entity is further determined based on a context in which a reference to a brand entity is presented within a body of the electronic communication, and wherein the claimed source entity is determined to be the brand entity.

20. The one or more non-transitory computer-readable media of claim 17, wherein the number of authorized addresses associated with the claimed source entity is determined by communicating with a DNS registry server.

* * * * *